(12) United States Patent
Lee et al.

(10) Patent No.: US 7,958,364 B2
(45) Date of Patent: Jun. 7, 2011

(54) SYSTEM AND METHOD FOR DIGITALLY SIGNING ELECTRONIC DOCUMENTS

(75) Inventors: Chung-I Lee, Taipei Hsien (TW);
Chien-Fa Yeh, Taipei Hsien (TW);
Chiu-Hua Lu, Taipei Hsien (TW);
Xiao-Di Fan, Shenzhen (CN); Guo-Ling Ou-Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

(*) Notice: Subject to any disclaimer, the term of this patent is extended or adjusted under 35 U.S.C. 154(b) by 862 days.

(21) Appl. No.: 11/940,327

(22) Filed: Nov. 15, 2007

(65) Prior Publication Data
US 2009/0044019 A1    Feb. 12, 2009

(30) Foreign Application Priority Data
Aug. 9, 2007   (CN) .......................... 2007 1 0201324

(51) Int. Cl.
*H04L 9/32* (2006.01)
*H04L 9/08* (2006.01)

(52) U.S. Cl. ........ 713/176; 713/175; 713/177; 713/178; 713/179; 713/180; 713/181; 380/281; 380/284

(58) Field of Classification Search .................. 713/176
See application file for complete search history.

(56) References Cited

U.S. PATENT DOCUMENTS

| | | | | |
|---|---|---|---|---|
| 5,903,882 A | * | 5/1999 | Asay et al. | 705/44 |
| 5,995,625 A | * | 11/1999 | Sudia et al. | 705/51 |
| 6,021,202 A | * | 2/2000 | Anderson et al. | 705/54 |
| 6,079,018 A | * | 6/2000 | Hardy et al. | 713/170 |
| 6,209,091 B1 | * | 3/2001 | Sudia et al. | 713/175 |
| 6,226,618 B1 | * | 5/2001 | Downs et al. | 705/51 |

(Continued)

FOREIGN PATENT DOCUMENTS

CN   1722656 A   *   1/2006

(Continued)

OTHER PUBLICATIONS

Harn, L., Digital Multisignature with Distinguished Signing Authorities, 0014325212 E.I. Compendex No. 1999244635600, Jan. 1, 1999.*

*Primary Examiner* — Christopher A Revak
*Assistant Examiner* — Carolyn B Kosowski
(74) *Attorney, Agent, or Firm* — Frank R. Niranjan

(57) ABSTRACT

A system for digitally signing electronic documents is disclosed. The system includes a mobile device, an application server and a database, the mobile device includes a requesting module and a digest encrypting module, the application server includes an obtaining module, a digest generating module and a merging module. The requesting module is configured for sending a request for a digital signature of an electronic document to the application server; the obtaining module is configured for obtaining the electronic document from the database; the digest generating module is configured for generating a digest of the electronic document, and sending the digest to the mobile device; the digest encrypting module is configured for encrypting the digest, generating an encrypted value, and sending the encrypted value to the application server; the merging module is configured for merging the encrypted value and the electronic document. A related computer-based method is also disclosed.

8 Claims, 3 Drawing Sheets

U.S. PATENT DOCUMENTS

| | | | |
|---|---|---|---|
| 6,490,680 B1 * | 12/2002 | Scheidt et al. | 713/166 |
| 6,553,494 B1 * | 4/2003 | Glass | 713/186 |
| 6,785,815 B1 * | 8/2004 | Serret-Avila et al. | 713/176 |
| 6,959,382 B1 * | 10/2005 | Kinnis et al. | 713/170 |
| 6,959,384 B1 * | 10/2005 | Serret-Avila | 713/176 |
| 7,024,562 B1 * | 4/2006 | Flink et al. | 713/186 |
| 7,228,427 B2 * | 6/2007 | Fransdonk | 713/176 |
| 7,370,206 B1 * | 5/2008 | Goldman | 713/176 |
| 7,496,756 B2 * | 2/2009 | Oka et al. | 713/175 |
| 7,552,335 B2 * | 6/2009 | Iwamura | 713/176 |
| 7,624,272 B2 * | 11/2009 | Wiseman et al. | 713/176 |
| 2002/0062451 A1 * | 5/2002 | Scheidt et al. | 713/201 |
| 2002/0181701 A1 * | 12/2002 | Lee | 380/1 |
| 2003/0028774 A1 * | 2/2003 | Meka | 713/176 |
| 2004/0064703 A1 * | 4/2004 | Makita | 713/176 |
| 2005/0039018 A1 | 2/2005 | Wittkotter | |
| 2006/0271500 A1 * | 11/2006 | Obrea et al. | 705/76 |
| 2007/0220259 A1 * | 9/2007 | Pavlicic | 713/176 |
| 2008/0005570 A1 * | 1/2008 | Johnson et al. | 713/176 |
| 2008/0091735 A1 * | 4/2008 | Fukushima et al. | 707/200 |
| 2008/0091954 A1 * | 4/2008 | Morris et al. | 713/187 |
| 2008/0126805 A1 * | 5/2008 | Owlett et al. | 713/176 |
| 2008/0175431 A1 * | 7/2008 | Hayashi | 382/100 |
| 2009/0083541 A1 * | 3/2009 | Levine | 713/165 |
| 2010/0082994 A1 * | 4/2010 | Wang et al. | 713/176 |
| 2010/0124333 A1 * | 5/2010 | Godfrey et al. | 380/270 |

FOREIGN PATENT DOCUMENTS

| | | |
|---|---|---|
| EP | 1653655 A1 * | 5/2006 |
| WO | WO 2005055516 A1 * | 6/2005 |
| WO | WO 2007091002 A1 * | 8/2007 |

* cited by examiner

SYSTEM AND METHOD FOR DIGITALLY SIGNING ELECTRONIC DOCUMENTS

BACKGROUND OF THE INVENTION

1. Field of the Invention

The present invention is related to a system and method for digitally signing electronic documents.

2. Description of Related Art

The digital signature uses a hash algorithm and a public key cryptogram algorithm to encrypt and decrypt electronic documents. The hash algorithm (such as SHA1) is used for transforming the electronic document into a fixed-length character string that is usually 128 bit, 160 bit, 256 bit, and 512 bit, in order to shorten the length of the digital signature and improve the digital signature efficiency.

The public key cryptogram algorithm (such as RSA and ECC), also known as asymmetry algorithm, is used for encrypting and decrypting electronic documents with different keys (a public key and a private key). The public key is used for verifying the identity of a signer when the signer receives the digital signature. The private key is kept hidden and is used for the digital signature. A digital certificate includes a public key, a private key, signer information, and so on, which are issued by an authoritative third-party organization. Typically, electronic documents are signed digitally using a desktop computer or a notebook.

Therefore, what is needed is a system and method for digitally signing electronic documents which can digitally sign electronic documents using a mobile device such as a mobile phone.

SUMMARY OF THE INVENTION

A system for digitally signing electronic documents is provided in accordance with a preferred embodiment. The system includes a mobile device, an application server, and a database. The application server connects to the mobile device and the database. The database is configured for storing electronic documents to be signed digitally. The mobile device stores a digital certificate of a signer, the digital certificate includes a private key. The mobile device includes a requesting module and a digest encrypting module. The application server comprising an obtaining module, a digest generating module and a merging module. The requesting module is configured for sending a request for a digital signature of an electronic document to the application server. The obtaining module is configured for obtaining the electronic document from the database according to the request. The digest generating module is configured for generating a digest of the electronic document using a hash algorithm, and sending the digest of the electronic document to the mobile device. The digest encrypting module is configured for encrypting the digest of the electronic document with the private key using a public key cryptogram algorithm thereby generating a first encrypted value, and sending the first encrypted value to the application server. The merging module is configured for merging the electronic document and the first encrypted value according to the PKCS#7. The digest generating module is further configured for generating a digest of the merged document using the hash algorithm, and sending the digest of the merged document to the mobile device. The digest encrypting module is further configured for encrypting the digest of the merged document with the private key using the public key cryptogram algorithm thereby generating a second encrypted value, and sending the second encrypted value to the application server. The merging module is further configured for merging the first encrypted value, the second encrypted value and the electronic document according to the PKCS#7 thereby generating a digitally-signed electronic document.

A computer-based method for digitally signing electronic documents is also provided. The method includes the steps of: sending a request for a digital signature of an electronic document to an application server through a mobile device, the mobile device storing a digital certificate of a signer, the digital certificate including a private key; obtaining the electronic document by the application server from a database according to the request, generating a digest of the electronic document using a hash algorithm, and sending the digest of the electronic document to the mobile device; encrypting the digest of the electronic document with the private key using a public key cryptogram algorithm through the mobile device thereby generating a first encrypted value, and sending the first encrypted value to the application server; merging the electronic document and the first encrypted value according to the PKCS#7 through the application server, generating a digest of the merged document using the hash algorithm, and sending the digest of the merged document to the mobile device; encrypting the digest of the merged document with the private key using the public key cryptogram algorithm through the mobile device thereby generating a second encrypted value, and sending the second encrypted value to the application server; merging the first encrypted value, the second encrypted value and the electronic document according to the PKCS#7 through the application server thereby generating a digitally-signed electronic document.

Other systems, methods, features, and advantages of the present invention will become apparent to one with skill in the art upon examination of the following drawings and detailed description.

DETAILED DESCRIPTION OF THE INVENTION

Figure 1:
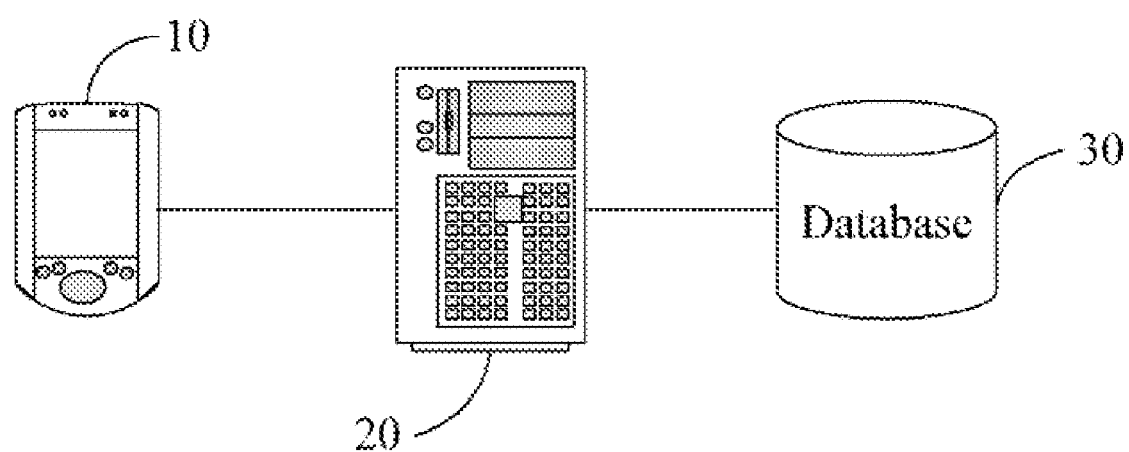
FIG. 1 is a schematic diagram of hardware configuration of a system for digitally signing electronic documents in accordance with a preferred embodiment.

FIG. 1 is a schematic diagram of hardware configuration of a system for digitally signing electronic documents (hereinafter, "the system") in accordance with a preferred embodiment. The system typically includes a mobile device 10, an application server 20, and a database 30. The application server 20 connects with the mobile device 10 and the database 30. The mobile device 10 may connect to the application server 20 through the Bluetooth technology. The mobile device 10 can be a mobile phone, a personal digital assistant (PDA) or any other suitable electronic device. The database 30 is configured for storing electronic documents to be signed digitally.

Figure 2:
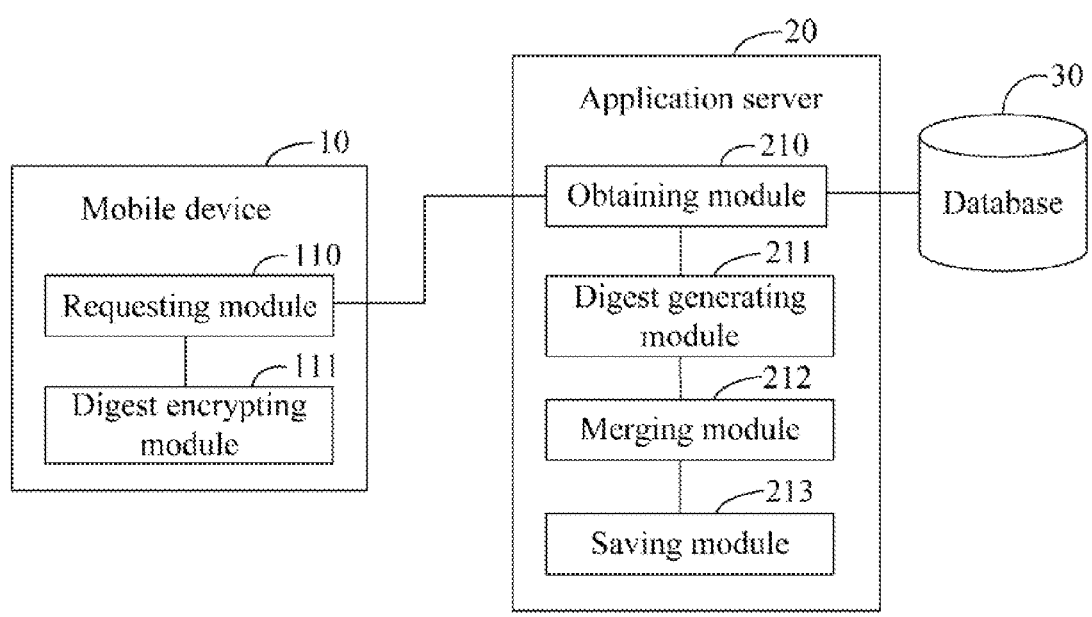
FIG. 2 is a schematic diagram showing function modules of the system of FIG.1.

FIG. 2 is a schematic diagram showing function modules of the system of FIG. 1. The mobile device 10 may include a requesting module 110 and a digest encrypting module 111. The application server 20 may include an obtaining module 210, a digest generating module 211, a merging module 212, and a saving module 213.

The requesting module 110 is configured for sending a request for a digital signature of an electronic document to the application server 20 when a signer selects the electronic document to be signed digitally through the mobile device 10. The mobile device 10 stores a digital certificate of the signer. The digital certificate may include personal information of the signer, a private key for encrypting the electronic document, and a period of validity of the digital certificate.

The obtaining module 210 is configured for obtaining the electronic document from the database 30 according to the request. The digest generating module 211 is configured for generating a digest of the electronic document using a hash algorithm such as the Secure Hash Algorithm 1 (SHA1), and sending the digest of the electronic document to the mobile device 10.

The digest encrypting module 111 is configured for encrypting the digest of the electronic document with the private key using a public key cryptogram algorithm such as the RSA algorithm thereby generating a first encrypted value, and sending the first encrypted value to the application server 20. The letters RSA are the initials of surnames of Ron Rivest, Adi Shamir, and Len Adleman.

The merging module 212 is configured for merging the electronic document and the first encrypted value according to the PKCS#7 (Cryptographic Message Syntax Standard). The PKCS refers to a group of Public Key Cryptography Standards.

The digest generating module 211 is further configured for generating a digest of the merged document using the hash algorithm such as the secure hash algorithm 1 (SHA1), and sending the digest of the merged document to the mobile device 10.

The digest encrypting module 111 is further configured for encrypting the digest of the merged document with the private key using the public key cryptogram algorithm such as the RSA algorithm thereby generating a second encrypted value, and sending the second encrypted value to the application server 20.

The merging module 212 is further configured for merging the first encrypted value, the second encrypted value, and the electronic document according to the PKCS#7 thereby generating a digitally-signed electronic document, and saving the digitally-signed electronic document in the database 30.

Figure 3:
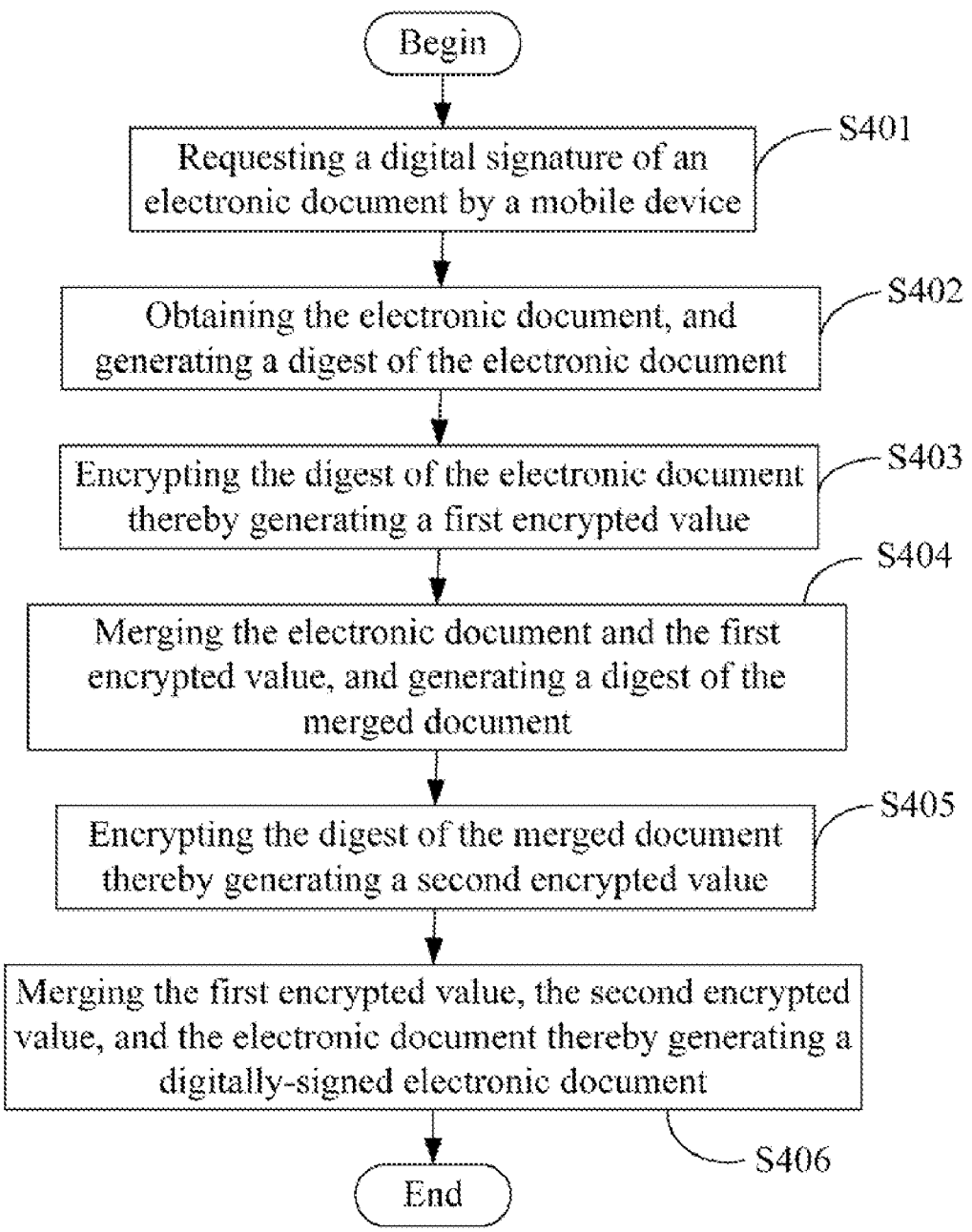
FIG. 3 is a flowchart of a preferred method for digitally signing electronic documents in accordance with one embodiment.

FIG. 3 is a flowchart of a preferred method for digitally signing electronic documents in accordance with one embodiment. In step S401, the requesting module 110 sends a request for a digital signature of an electronic document to the application server 20 when a signer selects the electronic document to be signed digitally through the mobile device 10. The mobile device 10 stores a digital certificate of the signer. The digital certificate may include personal information of the signer, a private key for encrypting the electronic document, and a period of validity of the digital certificate.

In step S402, the obtaining module 210 obtains the electronic document from the database 30 when the application server 20 receives the request. Then, the digest generating module 211 generates a digest of the electronic document using a hash algorithm such as the Secure Hash Algorithm 1 (SHA1), and sends the digest of the electronic document to the mobile device 10.

In step S403, the digest encrypting module 111 encrypts the digest of the electronic document with the private key using the public key cryptogram algorithm such as the RSA algorithm thereby generating a first encrypted value, and sends the first encrypted value to the application server 20.

In step S404, the merging module 212 merges the electronic document and the first encrypted value according to the PKCS#7 (Cryptographic Message Syntax Standard). Then, the digest generating module 211 generates a digest of the merged document using the hash algorithm such as the secure hash algorithm 1 (SHA1), and sends the digest of the merged document to the mobile device 10.

In step S405, the digest encrypting module 111 encrypts the digest of the merged document with the private key using the public key cryptogram algorithm such as the RSA algorithm thereby generating a second encrypted value, and sends the second encrypted value to the application server 20.

In step S406, the merging module 212 merges the first encrypted value, the second encrypted value and the electronic document according to the PKCS#7 thereby generating a digitally-signed electronic document, and saves the digitally-signed electronic document in the database 30.

It should be emphasized that the above-described embodiments of the present invention, particularly, any preferred embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for digitally signing electronic documents, the system comprising a mobile device, an application server, and a database, the application server being connected to the mobile device and the database, the database being configured for storing electronic documents to be signed digitally, the mobile device storing a digital certificate of a signer, the digital certificate comprising a private key, the mobile device comprising a requesting module and a digest encrypting module, the application server comprising an obtaining module, a digest generating module and a merging module, wherein:

the requesting module is configured for sending a request for a digital signature of an electronic document to the application server;

the obtaining module is configured for obtaining the electronic document from the database according to the request;

the digest generating module is configured for generating a digest of the electronic document using a hash algorithm, and sending the digest of the electronic document to the mobile device;

the digest encrypting module is configured for encrypting the digest of the electronic document with the private key using a public key cryptogram algorithm thereby generating a first encrypted value, and sending the first encrypted value to the application server;

the merging module is configured for merging the electronic document and the first encrypted value according to the PKCS #7 standard;

the digest generating module is further configured for generating a digest of the merged document using the hash algorithm, and sending the digest of the merged document to the mobile device;

the digest encrypting module is further configured for encrypting the digest of the merged document with the private key using the public key cryptogram algorithm thereby generating a second encrypted value, and sending the second encrypted value to the application server; and the merging module is further configured for merging the first encrypted value, the second encrypted value and the electronic document according to the PKCS #7 standard thereby generating a digitally-signed electronic document.

2. The system according to claim 1, wherein the hash algorithm is the Secure Hash Algorithm 1 (SHA1).

3. The system according to claim 2, wherein the public key cryptogram algorithm is the RSA algorithm.

4. A computer-based method for digitally signing electronic documents, the method comprising:

sending a request for a digital signature of an electronic document to an application server through a mobile device, the mobile device storing a digital certificate of a signer, the digital certificate including a private key;

obtaining the electronic document by the application server from a database according to the request, generating a digest of the electronic document using a hash algorithm, and sending the digest of the electronic document to the mobile device;

encrypting the digest of the electronic document with the private key using a public key cryptogram algorithm through the mobile device thereby generating a first encrypted value, and sending the first encrypted value to the application server;

merging the electronic document and the first encrypted value according to the PKCS #7 standard through the application server, generating a digest of the merged document using the hash algorithm, and sending the digest of the merged document to the mobile device;

encrypting the digest of the merged document with the private key using the public key cryptogram algorithm through the mobile device thereby generating a second encrypted value, and sending the second encrypted value to the application server; and merging the first encrypted value, the second encrypted value and the electronic document according to the PKCS #7 standard through the application server thereby generating a digitally-signed electronic document.

5. The method according to claim 4, wherein the hash algorithm is the Secure Hash Algorithm 1 (SHA1).

6. The method according to claim 4, wherein the public key cryptogram algorithm is the RSA algorithm.

7. A method for digitally signing electronic documents using an application server, the method comprising:

receiving a request for a digital signature of an electronic document sent from a mobile device to the application server;

obtaining the electronic document by the application server from a database according to the request, generating a digest of the electronic document using a hash algorithm, and sending the digest of the electronic document to the mobile device;

receiving a first encrypted value from the mobile device, the first encrypted value being obtained by encrypting the digest of the electronic document;

merging the electronic document and the first encrypted value according to the PKCS #7 standard through the application server, generating a digest of the merged document using the hash algorithm, and sending the digest of the merged document to the mobile device;

receiving a second encrypted value from the mobile device, the second encrypted value being obtained by encrypting the digest of the merged document; and merging the first encrypted value, the second encrypted value and the electronic document according to the PKCS #7 standard through the application server thereby generating a digitally-signed electronic document.

8. A method for digitally signing electronic documents using a mobile device, the method comprising:

sending a request for a digital signature of an electronic document to an application server through the mobile device, the mobile device storing a digital certificate of a signer, the digital certificate including a private key;

receiving a digest of the electronic document sent from the application server;

encrypting the digest of the electronic document with the private key using a public key cryptogram algorithm through the mobile device thereby generating a first encrypted value, and sending the first encrypted value to the application server;

receiving a digest of a merged document sent from the application server, the merged document being obtained by merging the electronic document and the first encrypted value; and encrypting the digest of the merged document with the private key using the public key cryptogram algorithm through the mobile device thereby generating a second encrypted value, and sending the second encrypted value to the application server for merging with the first encrypted value and the electronic document thereby generating a digitally-signed electronic document.

* * * * *